United States Patent [19]

Sommer

[11] Patent Number: 4,496,032

[45] Date of Patent: Jan. 29, 1985

[54] BRAKE UNIT

[75] Inventor: Gordon M. Sommer, Boca Raton, Fla.

[73] Assignee: Sommer Co., Warren, Mich.

[21] Appl. No.: 518,664

[22] Filed: Jul. 29, 1983

Related U.S. Application Data

[60] Division of Ser. No. 333,314, Dec. 22, 1981, Pat. No. 4,424,887, which is a continuation of Ser. No. 80,456, Oct. 1, 1979, abandoned.

[51] Int. Cl.³ .................. B60T 8/12; F16D 65/78; F16D 57/00
[52] U.S. Cl. .................. 188/180; 188/264 F; 192/8 R; 254/310
[58] Field of Search .......... 188/71.6, 187, 290, 188/293, 294, 180, 264 R, 264 B, 264 D, 264 E, 188/264 F, 264 P; 192/8 R, 15, 113 B, 147, 0.032, 192/0.033, 0.076, 8 A; 254/310, 315, 270, 367,377

[56] References Cited

U.S. PATENT DOCUMENTS

| | | | |
|---|---|---|---|
| 2,759,702 | 8/1956 | Abraham | 188/180 X |
| 3,086,621 | 4/1963 | Dale | 254/310 X |
| 3,901,478 | 8/1975 | Peterson | 254/367 X |
| 4,046,235 | 9/1977 | Shutt | 192/8 R X |
| 4,077,500 | 3/1978 | Hickman, Sr. et al. | 188/264 F |
| 4,424,887 | 1/1984 | Sommer | 188/180 X |

Primary Examiner—Bruce H. Stoner, Jr.
Assistant Examiner—Robert J. Oberleitner
Attorney, Agent, or Firm—Harness, Dickey & Pierce

[57] ABSTRACT

There is disclosed herein a brake unit of the oil shear type which is specifically designed for use in controlling the drawworks of drilling rigs or the like. The drawworks brake unit comprises an input shaft driven by the drawworks which operates to drive a gear pump for circulating high volumes of oil under pressure over interposed brake discs and plates and through adjacent restricted orifices during a first direction of rotation such as during lowering of the pipe stands so as to both cool and lubricate the discs and plates. During an opposite rotation of the input shaft, such as during raising of the pipe stands, an alternate flowpath is provided bypassing the restricted orifices so as to reduce the drag placed on the drawworks during raising of the pipe stands. During the first direction of rotation or lowering, the gear pump also operates to provide self-actuating overspeed safety protection as well. A unique stepped oil sealing arrangement is also provided to prevent oil leakage between the input shaft and housing due to the high pressure generated therein.

5 Claims, 7 Drawing Figures

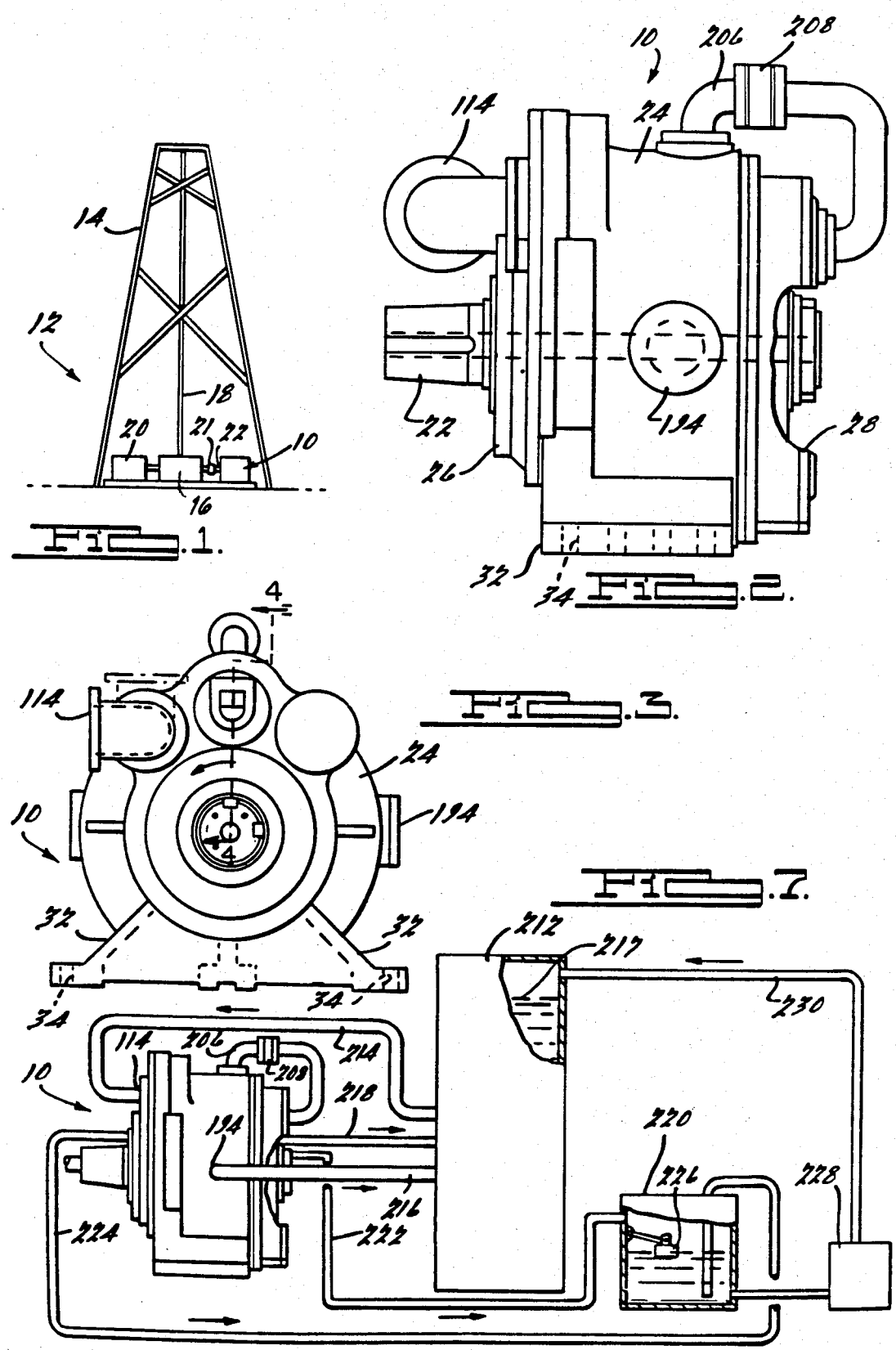

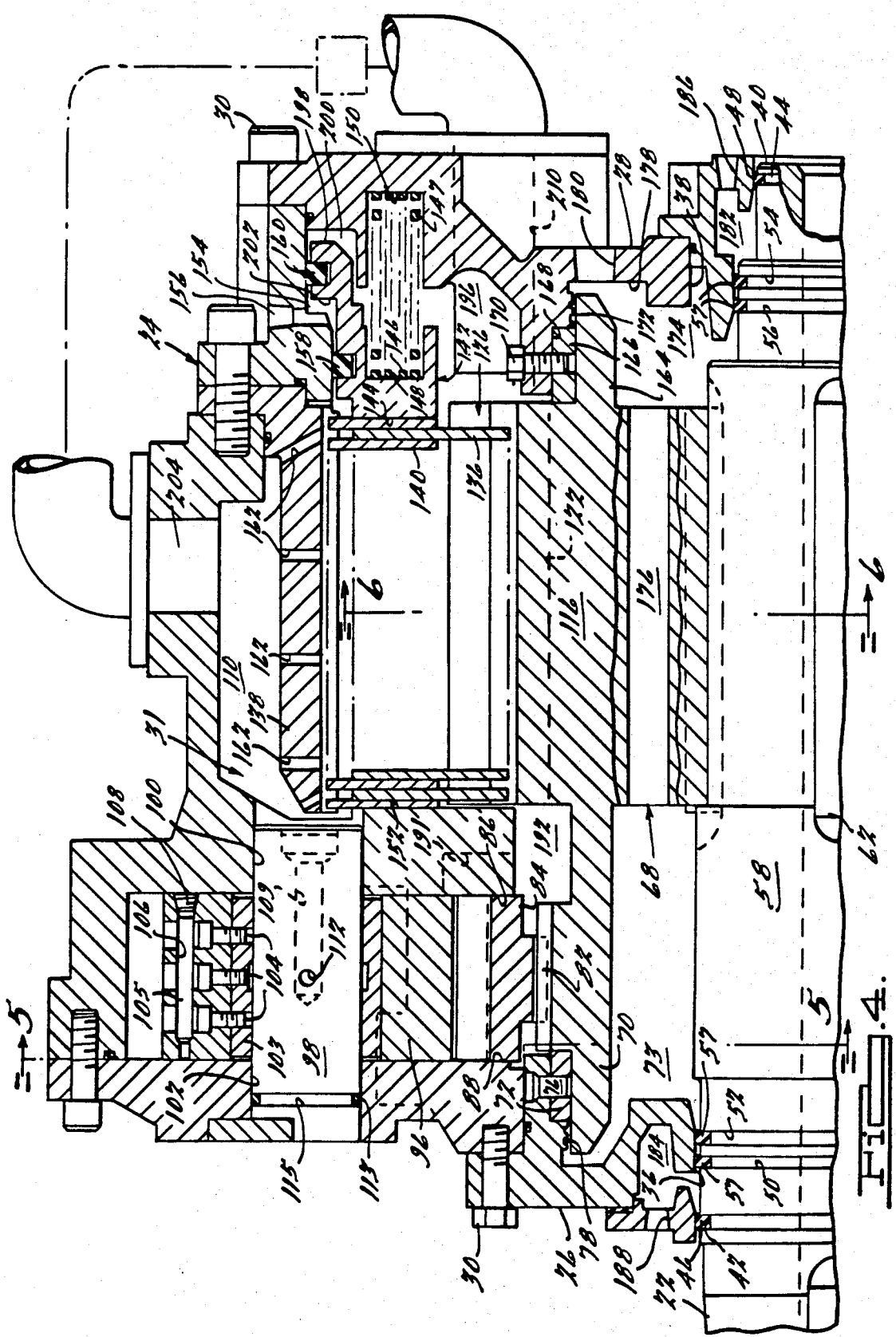

BRAKE UNIT

This is a division of application Ser. No. 333,314, filed Dec. 22, 1981, now U.S. Pat. No. 4,424,887, issued Jan. 10, 1984 which is a continuation of Ser. No. 080,456 filed Oct. 1, 1979 now abandoned.

BACKGROUND AND SUMMARY OF THE INVENTION

The present invention relates generally to brake units and more particularly to brake units of the oil shear type having internal oil pump means operative to selectively circulate oil in response to rotation of the brake unit in a preselected direction.

Various types of brake units are used in conjunction with well drilling rigs such as those used in construction of oil and gas wells. In one manner of drilling oil and gas wells, a length or stand of pipe is connected to a drill bit which is then rotated thereby drilling deeper into the ground. As the well progresses, it is necessary to install a casing which usually consists of stands of larger diameter pipe connected together which operate to guide the drilling apparatus, support surrounding ground formations, seal the sides of the opening as well as other various purposes. The drilling apparatus generally comprises a drawworks assembly which includes a cable drum, driving apparatus for rotatably driving the cable drum, a main brake and a secondary brake often referred to as a mode absorber. The drawworks performs various functions including raising and lowering the drilling pipe and bit for bit replacement, and connection of additional stands of drill pipe as well as to control drilling pressure. Also, the drawworks may be used to assist in installation of the casing as well as replacement thereof should the casing become worn due to extended drilling operations. The main brake is commonly intimately associated with the cable drum of the drawworks operating to stop and hold the drilling apparatus, pipe stands or the like at any desired position whereas the mode absorber operates in the nature of a governor to limit lowering speeds. The mode absorber may be in the form of a water brake which utilizes the resistance of a turbine rotating through a fluid for example. While the mode absorber does reduce the rate of acceleration thereby increasing the available response time for an operator to effect corrective measures, it will constitute a significant drag during raising operations unless disconnected from the drawworks. If the mode absorber is allowed to remain connected to the drawworks, power consumption may be significantly increased as well as operating speeds reduced due to this drag. Thus, it is generally necessary to disconnect the mode absorber during raising. Not only does the disconnecting procedure require loss of valuable operating time but also the disconnection of the mode absorber eliminates the added safety factor due to the increased response time provided thereby within which the operator may actuate the brake should a power failure be encountered. Further, such absorbers constitute an additional piece of equipment requiring maintenance as well as additional controls to adjust the resistance for varying lowering speeds.

Accordingly, the present invention provides a brake unit for use in conjunction with such drawworks which combines in a unit apparatus capable of performing the functions heretofore performed by both the main brake and mode absorber and further which is substantially more economical and efficient to operate as well as providing for fail-safe operation to protect associated drilling equipment from damage due to a power failure, brake through of the drilling bit into an underground cavern or any other such occurrences.

The present invention includes an input shaft operatively connected to the drawworks which drives an internal oil gear pump which is operative to circulate a large volume of oil through the brake unit along a first flowpath in response to rotation of the input shaft in one direction such as during lowering of pipe stands so as to cool and lubricate the brake discs and plates. During a raising operation, the gear pump operates to circulate oil through an alternative low resistance flowpath so as to reduce the drag due to pump operation. Thus, during lowering of pipe or other tooling or equipment into the well, the gravitational forces acting thereon also operate to drive this internal oil pump thereby circulating large quantities of oil through the brake unit. As this lowering operation represents the severest duty for the brake unit, the need for oil circulation for both cooling and lubricating is greatest during this mode of operation. However, during raising of pipe or equipment from the well, it is desirable to reduce drag on the driving equipment to an absolute minimum so as to allow such operations to be completed as rapidly as possible and with a minimum consumption of power. Heretofore, it has often been desirable to expend additional time and labor to disconnect the brake unit from the drawworks in order to reduce this drag. In the present invention, the oil flowpath within the brake unit is designed to minimize the drag resulting therefrom during such raising operations thereby eliminating the time consuming job of disconnecting the brake unit from the drawworks. This also enables the brake unit to act as a safety back-up during raising operations. Should an equipment failure be encountered during a raising operation, the internal oil pump will immediately be actuated in response to the descending tooling and will operate to override the control fluid pressure to actuate the brake unit thereby minimizing the possibility of equipment damage resulting therefrom.

Additional advantages and features of the present invention will become apparent from the following description of a preferred embodiment taken in conjunction with the drawings and claims appended hereto.

BRIEF DESCRIPTION OF THE DRAWINGS

FIG. 1 is an elevational view of a drilling rig having drawworks apparatus for raising and lowering stands of pipe to which a brake unit in accordance with the present invention is operatively connected;

FIG. 2 is a side elevational view of the brake unit of the present invention;

FIG. 3 is a front elevational view of the present invention;

FIG. 4 is a fragmentary longitudinal cross-sectional view of the upper portion of the present invention, the section being taken substantially along the line 4—4 of FIG. 3;

FIG. 7 is an elevational view of the brake unit of FIG. 2 shown in operative relationship to associated primary and secondary fluid reservoirs.

DESCRIPTION OF THE PREFERRED EMBODIMENT

Figure 5:
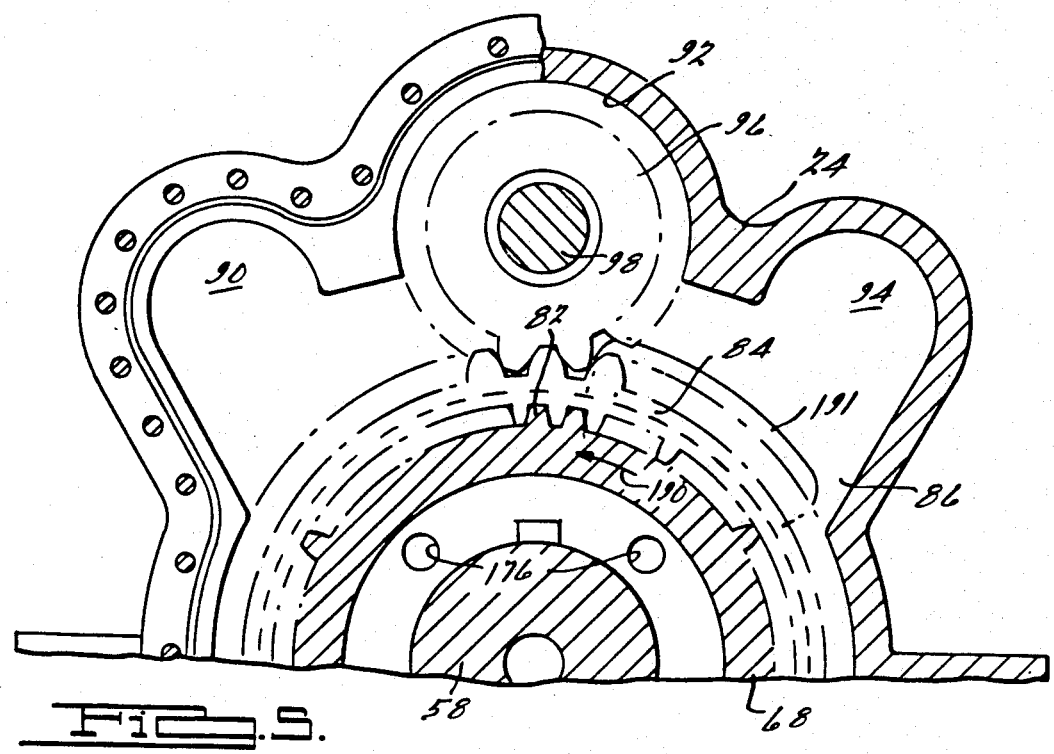
FIG. 5 is a fragmentary transverse cross-sectional view of the present invention, the section being taken along line 5—5 of FIG. 4.

Referring now to the drawings and in particular to FIG. 1, there is illustrated a brake unit 10 in accordance with the present invention shown in operative relationship to a drilling rig assembly 12. Drilling rig assembly 12 may be of any conventional design such as those commonly utilized in oil and gas well constructions and will generally include a derrick 14, a conventional drawworks assembly 16 having cables 18 leading to derrick 14 and cooperable with blocks supported thereon for raising and lowering tooling, drill bits, or other equipment out of and into the well, and associated drive means 20 for driving drawworks 16. Drive means 20 may conventionally be of any type suitable for use in the particular locality of drilling such as an electric motor, gas or diesel engine or even steam engine if desired. In any event, an input shaft 22 of brake unit 10 will be operatively connected to drawworks assembly 16 either via drive means 20 or directly to the drawworks shaft 21 as illustrated so as to control rotation thereof during operation as is described in greater detail below.

Referring now to FIGS. 2 through 4, the construction of brake unit 10 will be described in detail. As shown, the brake unit 10 comprises a housing 24 of generally cylinrical cross-section having a pair of longitudinal spaced end plates 26 and 28 secured to opposite ends thereof by a plurality of suitable fasteners such as bolts 30 so as to define a cavity 31 therebetween. Housing 24 also has a plurality of depending mounting feet or flange portions 32 provided with suitable openings 34 therein so as to enable the brake unit to be secured to a work platform or other suitable foundation or supporting surface.

As best seen with reference to FIG. 4, end plate 26 has an opening 36 provided therein through which input shaft 22 extends into cavity 31. Similarly, end plate 28 also has an opening 38 within which the terminal end 40 of input shaft 22 is received. Input shaft 22 is provided with a pair of axially spaced annular grooves 42 and 44 adjacent opposite ends thereof within which are fitted dust seals 46 and 48 respectively so as to effectively seal shaft 22 within respective openings 36 and 38. Additional annular grooves 50, 52, and 54, 56 are disposed on shaft 22 interiorly from respective grooves 46 and 48 and are all adapted to receive suitable oil seals 57. Preferably, dust seals 46 and 48 as well as oil seals 50, 52, 54, and 56 will be in the form of piston rings.

An interiorly disposed portion 58 of input shaft 22 is provided with at least one end and preferably two circumferentially spaced axially extending slots or keyways 60 and 62 which are adapted to receive elongated keys 64 and 66.

A generally cylindrically shaped gear and brake disc carrier 68 is fixedly secured to portion 58 of input shaft 22 and has an axially extending radially outwardly spaced flange portion 70 designed to engage a bushing 72 mounted within end plate 26 so as to rotatably support the driven end portion 74 of input shaft 22. Bushing 72 is secured to end plate 26 by suitable fastening means in the form of radially inwardly extending bushing screws 76. Immediately adjacent and axially outwardly of bushing 72, end plate 26 is provided with an annular labyrinth comprising a plurality of grooves 78 provided in end plate 26 and surrounding flange portion 70 in close proximity thereto so as to control or limit oil leakage through bushing 72 into area 73 surrounding input shaft 22. Gear and brake disc carrier 68 will preferably be shrink fitted to input shaft 22 with keys 64 and 66 being operative to prevent relative rotation therebetween.

Gear and brake disc carrier 68 has an enlarged diameter splined center portion 82 upon which an annular or ring gear 84 having a correspondingly splined center bore is supported for rotation therewith. Gear 84 is supported upon gear carrier 68 in such a manner as to enable relative axial movement therebetween, gear 84 being axially restrained between axially spaced opposed wall portions 86 and 88 of housing 24.

As best seen in FIG. 5, housing 24 is provided with three circumferentially spaced interconnected chambers 90, 92, and 94 disposed radially outward from gear 84. Center chamber 92 has a gear pump 96 rotatably supported upon a fixed shaft 98. Opposite end portions of shaft 98 are received within openings 100 and 102 provided in wall portions 86 and 88 respectively. A bushing 103 is secured to gear pump 96 by a plurality of screws 104 extending radially inward from the circumference thereof. In order to prevent screws 104 from backing out during operation, a dowel 105 is installed in an axially extending passage 106 in a position so as to overlie the radial outer portion of screws 104. Dowel 105 may be retained within passage 106 in any suitable manner such as by a plug 108. In order to supply lubricant to bushing 103, shaft 98 is provided with an axially extending passage 109 opening into space 110 and having a radially extending passage 112 communicating with the inner end thereof. As shown, radial passage 112 is positioned so as to be approximately aligned with the axial center of bushing 103. Shaft 98 is also provided with an oil seal 113 disposed within groove 115 provided on the outer or left end thereof as seen in FIG. 4 which operates to prevent oil leakage therefrom.

Preferably both bushings 72 and 103 will be circumferentially segmented with slight clearances being provided between each of the segments so as to allow for thermal expansion thereof during operation of the brake unit.

As best seen with reference to FIGS. 2 and 3, chamber 90 is provided with an outwardly opening fluid inlet connection 114 adapted to have a fluid conduit connected thereto so as to supply fluid to chamber 90. Chamber 90 then acts as a supply reservoir supplying such fluid to gear pump 96 which is driven by counterclockwise rotation of input shaft 22 via gear 84 and is operative to pump such fluid under pressure into the next circumferentially spaced adjacent chamber 94.

Figure 6:
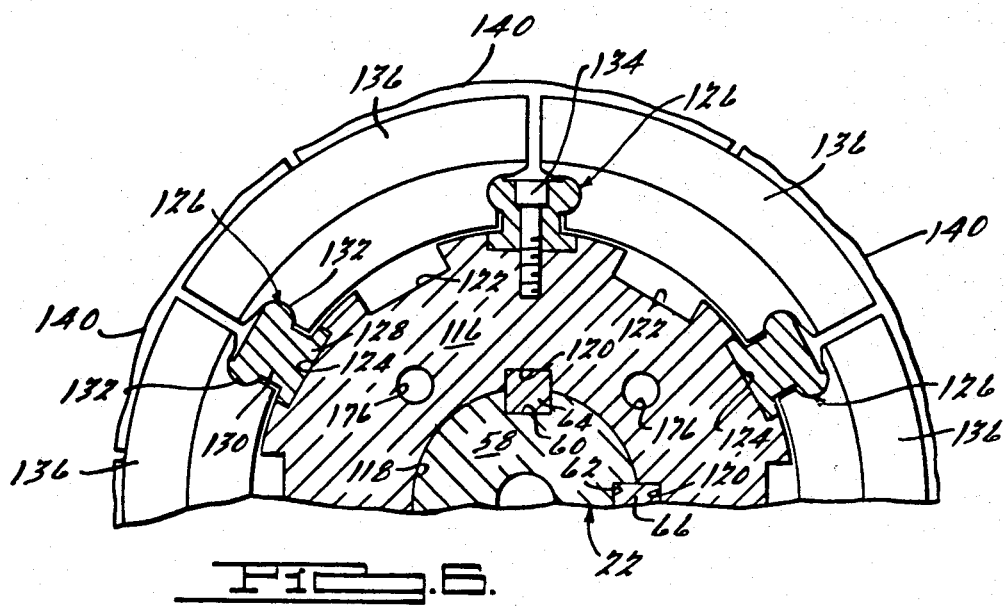
FIG. 6 is a fragmentary transverse cross-sectional view of the present invention, the section being taken along line 6—6 of FIG. 4.

An enlarged diameter generally cylindrical center portion 116 of gear and brake disc carrier member 68 is provided with a plurality of circumferentially spaced axially extending relatively shallow slots 122 which operate to provide axial oil passages for conducting lubricant to the brake discs and plates. A second plurality of circumferentially spaced axially extending slots 124 are also provided on portion 116 interposed between slots 122, each of which is adapted to receive an axially extending elongated gib 126. Gibs 126 are of an irregular shape generally as shown in FIG. 6 having a base portion 128 which is received in slot 124, a circumferentially narrowed neck portion 130 extending generally radially outward therefrom and oppositely circumferentially outwardly extending arcuate shaped upper portions 132. Each of gibs 126 are preferably secured to portion 116 of gear carrier 68 by a plurality of axially spaced fasteners 134 threadedly engaging openings provided in the bottom portions of slots 124. Extending between and adapted to be retained by respective gibs 126 are a plurality of radially outwardly extending brake discs 136 which are axially movable therealong and rotatable with input shaft 22. Gibs 126 and brake discs 136 may be of the type disclosed in copending application Ser. No. 849,857 entitled Clutch Unit and assigned to the assignee of the present invention, the disclosure of which is hereby incorporated by reference. Alternatively, if desired brake discs 136 may be in the form of continuous annular rings as opposed to circumferentially segmented discs as shown.

Center portion 116 of gear carrier 68 also has an axially extending flange portion 164 extending to the right as viewed in FIG. 4 which engages a bushing 166 secured in a recess 168 provided in end wall 28 so as to thereby rotatably support terminal end portion 40 of input shaft 22. Bushing 166 is preferably circumferentially segmented so as to allow for thermal expansion thereof and each of the segments are secured in recess 168 by a suitable threaded fastener 170. Another labyrinth comprising a plurality of grooves 172 is also provided being disposed axially outwardly from bushing 166 which serves to control the amount of lubricating oil leakage therefrom into area 174 surrounding input shaft 22.

A brake plate support member 138 is fixedly secured to housing 24 and projects axially inward into cavity 31 in radially outwardly spaced relationship to brake discs 136. A plurality of brake plates 140 are axially movable mounted on member 138 and project radially inward therefrom, the same being interposed between respective brake discs 136. Brake plate support member 138 is also provided with a plurality of radially extending spaced restricted openings 162 which operate to allow oil supplied to the brake plates and discs to flow radially outward therefrom during a lowering operation into area 110.

Center portion 116 of gear carrier 68 is also provided with a plurality of axially extending spaced bores 176 having one end opening into area 174 and the other end opening into area 73. Bores 176 serve to place area 73 in fluid communication with area 174 so as to equalize the pressure therebetween and allow oil accumulating within area 73 to drain into area 174. End wall 178 is provided with an opening 180 to which a fluid conduit may be connected to return oil from areas 73 and 174 to a remote main reservoir or tank. Also, a relatively small quantity of oil will leak past seals 57 provided on opposite end portions of input shaft 22 thereby lubricating same and will accumulate in respective areas 182 and 184 provided adjacent to and surrounding terminal end portion 40 and driven end portion 74 of input shaft 22 respectively. To prevent excessive accumulation and loss of oil in areas 182 and 184, openings 186 and 188 respectively are provided to which fluid conduits may be connected to direct this leakage oil to a remote secondary reservoir or scavenger tank.

Actuating means are provided for selectively axially moving brake discs 136 and plates 140 into and out of braking relationship which include an axially movable piston assembly 142 having a brake plate engaging surface 144. Resilient biasing means in the form of a plurality of pairs of coaxially arranged helical compression springs 146, 147 are provided extending between surface 148 of piston 142 and recessed seating surfaces 150 of housing 24. Springs 146 and 147 are operative to cause piston 142 to exert a clamping force on brake discs 136 and plates 140 between surface 144 and an axially spaced opposed surface portion 152 of housing 24. A control pressure chamber 154 is also provided which receives pressurized control hydraulic fluid through passage 156 in housing 24 which fluid operates to move piston 142 axially to the right as seen in FIG. 4 overcoming the biasing force of springs 146 and 147 thereby releasing the clamping force. Pressure chamber 154 is sealed by axially spaced fluid seals 158 and 160 provided on piston assembly 142.

As shown in FIG. 7, brake unit 10 has inlet 114 and outlet 194 connected to a primary lubricant reservoir or tank 212 via conduits 214 and 216 respectively. As brake unit 10 is designed for cyclic and reversing operation, it is desirable to maintain cavity 31 in a lubricant flooded condition so as to prevent cavitation or pounding of gear pump 96. This may be easily accomplished by merely positioning tank 212 so as to place the oil level 217 therein above the top of brake unit 10. Another return conduit 218 is also connected to tank 212 extending from opening 180 of brake unit 10 and operative to return lubricant accumulating within areas 73 and 174 thereof.

A secondary tank 220 is also provided having fluid conduits 222 and 224 extending from openings 186 and 188 respectively connected thereto which operate to drain lubricant from areas 182 and 184 respectively. A float switch 226 is provided in tank 220 which controls a pump 228 so as to return lubricant accumulating within tank 220 to primary tank 212 via conduit 230. Preferably, tank 220 will be positioned relative to brake unit 10 so as to enable gravity draining of lubricant from areas 182 and 184. As only a relatively small amount of lubricant is anticipated to accumulate in areas 182 and 184 of brake unit 10, it is believed preferable to employ a cyclically operating system utilizing a level responsive pump means; however, if desired a continuously operating relatively low capacity pump could be utilized in place thereof.

The operation of brake unit 10 will now be described in conjunction with the operation of a drilling rig although it should be noted that the present invention may find application in conjunction with other varied apparatus.

As illustrated, brake unit 10 is constructed for rotation of input shaft 22 in a counterclockwise direction as indicated by arrow 190 during a lowering operation. In order to initiate a lowering operation, it is first necessary to release the braking force generated by the clamping action exerted by piston assembly 142 on interposed brake discs 136 and plates 140 due to springs 146 and 147. This is accomplished by admitting hydraulic fluid under controlled pressure through passage 156 into chamber 154 thereby causing piston assembly 142 to move axially to the right as viewed in FIG. 4 reducing the clamping pressure and allowing gravitational forces acting on the equipment to be lowered to impart counterclockwise rotation to inut shaft 22. This counterclockwise rotation of input shaft 22 and associated gear carrier 68 and gear 84 will operate to cause a clockwise rotation of gear pump 96 which will operate to pump oil under pressure from inlet 114 and chamber 90 through pumping chamber 92 into chamber 94. Wall portion 86 of chamber 94 is provided with an arcuate shaped slot 191 which places chamber 94 in fluid communication with area 192 adjacent gear carrier 68. Oil will thus be applied under pressure to provide lubrication to splines 82 and therethrough to bushing 72 and a controlled leakage amount through labyrinth 78 to seals 57. The majority of this pressurized oil will be forced from area 192 through axially extending slots 122 and thence radially outwardly between interposed brake discs 136 and brake plates 140 thereby providing a continuous film between these opposed surfaces as well as serving to lubricate and cool same. This oil will then flow into area 110 via passages 162 provided in brake plate support member 138. Both the number and size of passages 162 will be selected relative to the volume of oil flow so as to generate a substantial pressure drop thereacross. Thus, during a lowering operation area 192 will experience a relatively high pressure substantially above that experienced by area 110. This pressure differential will, of course, be dependent upon the speed of rotation of input shaft 22 and associated gear pump 96.

A portion of the oil flowing into area 110 will be diverted to axially extending passage 109 and radially extending passage 112 so as to lubricate bushing 103 of gear pump 96. The remaining oil will accumulate in the lower portion of cavity 31 and be returned to a remote reservoir or supply tank via a return opening 194 provided in a lower sidewall portion of housing 24.

As best seen in FIG. 4, and as described above, the braking force generated by piston 142 is released by the application of a controlled hydraulic pressure to chamber 154 so as to overcome the biasing action of springs 146, 147. However, as the rotational speed of input shaft 22 increases, gear pump 96 will attempt to increase the oil flow through the brake unit which increased oil flow will be resisted by the controlled orifice passages 162 thereby resulting in an increased pressure within areas 192 and 196. As shown, piston 142 has a surface area 198 within another area or chamber 200 which is axially opposed to surface area 202 thereof disposed within chamber 154. Therefore as chamber 200 is in relatively unrestricted fluid communication with area 196, any increased fluid pressure therein will be exerted on surface 198 of piston 142. Thus, as the speed of rotation of input shaft 22 increases, pressure within area 196 and correspondingly within area 200 will increase to the point where the pressure differential between surfaces 202 and 198 will cause piston 142 to move axially to the left as illustrated thereby applying a braking force so as to decrease the rotational speed of shaft 22. As the speed decreases, the pressure within areas 196 and 200 will also decrease until a constant speed is achieved. Thus, the brake unit of the present invention provides internal self-governing speed regulation. This represents an important safety feature of the present invention in that should a sudden increase in lowering speed be encountered such as may occur should a drill break through into an underground cavern, a power failure during a raising operation or the like, the increased speed of rotation of gear pump 96 will increase the pressurization of the oil being circulated which increased oil pressure will overcome the control pressure exerted on piston assembly 142 so as to create a clamping force on brake discs 136 and plates 140 thereby preventing complete loss of control and possible equipment damage.

During a raising operation, input shaft 22 will be caused to rotate in a clockwise direction thereby imparting counterclockwise rotation to gear pump 96 causing the pumping action thereof to reverse or pump oil from chamber 94 to chamber 90.

As it is desirable to conduct the raising operations at as high a speed as possible within safe operating limits, restricted passage 162 will not be sufficient to allow enough oil flow therethrough to prevent starvation of gear pump 96. Further, in order to minimize the power required to effect raising of the drill stands, it is desirable to provide a free flowing supply of lubricant to gear pump 96 so as to reduce drag resulting therefrom. Accordingly, housing 24 is provided with an opening 204 communicating with area 110 to which a fluid conduit 206 is connected. Fluid conduit 206 extends through a check valve 208 to another opening 210 provided in end plate 28 which opens into area 196 of brake unit 16. Thus, as area 110 is maintained in an oil flooded condition due to the head pressure generated by the elevation of main supply tank oil level relative to the elevation of the brake unit, oil will be caused to flow through conduit 206, check valve 208 and into area 196. Thence, oil will be drawn through slots 122 into area 192, chamber 94 and through gear pump 96 being returned to the main supply tank via inlet chamber 90. Thus, starvation of gear pump 96 will effectively be prevented thereby eliminating the possibility of cavitation or pounding occurring. Further, this reduced drag feature eliminates the need for disconnecting the brake unit in order to achieve rapid raising of equipment from the drill hole with a minimum of power consumption. Thus, as the brake is continuously connected, it remains in standby condition providing an added safety factor should a power failure or other raising equipment faulter.

It should be noted that check valve 208 is designed to allow oil flow from area 110 to area 196 but prevent oil flow from 196 to area 110 thereby assuring pressurization of area 196 during lowering operations.

As previously mentioned, bushings 72 and 166 along with labyrinth grooves 78 and 172 operate to at least partially seal cavity 31 of brake unit 16. However, due to the relatively high pressure as well as the need to provide lubrication to bushings 72 and 166, some oil leakage will occur. Accordingly, areas 73 and 174 will both be subjected to some pressurized oil flow which oil is returned to the main tank via passages 176 and fluid conduit 218 connected to opening 180. Additionally, some oil leakage will occur past seals 57 at each end of shaft 22 into respective areas 182 and 184 to which fluid conduits 222 and 224 are connected which operate to drain fluid therefrom. However, the oil presence within areas 182 and 184 will be at or very near atmospheric pressure and because the oil level in tank 212 is above the level of areas 182 and 184 it is not possible to return this oil directly to the main tank due to the head produced thereby. Accordingly, fluid conduits 222 and 224 drain lubricant to secondary tank 220 thereby raising float switch 226 to a level sufficient to actuate pump 228. Pump 228 will then operate to return the oil from tank 220 to tank 212 via conduit 230 thereby reducing the oil level in tank 220 until float switch 226 de-actuates pump 228.

While brake unit 10 has been illustrated as constructed with input shaft 22 designed to rotate in a counterclockwise direction during lowering operations, this may be easily modified for clockwise rotation during lowering by moving inlet connection 114 to communicate with chamber 94 and moving slot 191 to the corresponding location in communication with chamber 90.

The operation and oil circulation pattern within brake unit 10 will otherwise be substantially identical to that described above.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A self-brake assembly for a drawworks of the oil shear type having automatic speed governing means, said drawworks including apparatus for raising and lowering stands of pipe, comprising:
    a housing;
    an input shaft rotatably journaled within said housing and rotatably associated with said apparatus for raising and lowering stands of pipe;
    a plurality of brake discs axially movably mounted on said input shaft and rotatable therewith;
    a plurality of brake plates nonrotatably axially movably mounted within said housing and interposed between said brake discs;
    clamping means for axially moving said brake discs and said brake plates into braking relationship;
    control means for releasing said clamping means whereby said input shaft is allowable to rotate; and
    means responsive to the speed of rotation of said input shaft only in one direction of rotation for overriding said control means and causing said clamping means to move said brake discs and said brake plates into braking relationship to automatically keep the speed of said shaft below a selected speed, wherein said means for overriding is entirely unresponsive to rotation of said input shaft in the opposite direction to said one direction, said speed of rotation responsive means comprising fluid pumping means driven by said input shaft and operative to generate a fluid pressure, the magnitude of said pressure varying directly with the speed of rotation of said input shaft, and passage means within said housing for conducting said fluid pressure to said clamping means.

2. A self-brake assembly as set forth in claim 1 wherein said fluid pumping means also operates to circulate fluid across said brake discs and plates.

3. A self-brake assembly as set forth in claim 1 wherein said clamping means includes biasing means for urging said brake discs and plates into braking relationship.

4. A self-brake assembly as set forth in claim 3 wherein said clamping means comprises a piston member movably disposed within said housing and having a surface engageable with one of said brake discs and plates and another surface communicating with said fluid pressure.

5. A self-brake assembly as set forth in claim 1, wherein said means for overriding said control means and causing said clamping means to move said brake discs and said brake plates into braking relationship is responsive to the speed of rotation of said input shaft only in the direction wherein said input shaft is rotatably associated with the lowering of said stands of pipe.

* * * * *